Patented Sept. 12, 1939

2,173,056

UNITED STATES PATENT OFFICE 2,173,056

DYES FOR CELLULOSE ESTERS AND ETHERS

Emmet F. Hitch and Swanie S. Rossander, Wilmington, Del., and Donovan E. Kvalnes, Penns Grove, N. J., assignors to E. I. du Pont de Nemours & Company, Wilmington, Del., a corporation of Delaware No Drawing. Application June 11, 1938, Serial No. 213,213

9 Claims. (Cl. 260—155)

This invention relates to monazo dyes, and especially to monazo dyes which are suitable for dyeing cellulose esters and ethers and are constituted as represented by the general formula

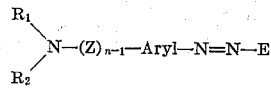

in which E is an azo dye coupling component, which is devoid of sulfonic or carboxy groups, Z is one of a group consisting of the radicals

—CH$_2$— and —SO$_2$—, $n$ is 1 or 2, R$_1$ is a polyhydroxyalkyl radical having four to six carbons and one less hydroxy than carbons, and R$_2$ is one of a group consisting of hydrogen, alkyl and a substituted alkyl radical.

Heretofore benzene-azo-bis-dihydroxyethyl-aniline in which benzene is substituted by nitro or amino and benzene-azo-bis-hydroxypropyl-aniline were known as soluble dyes for acetate silk but when the hydroxy alkyl radicals of these compounds contained four hydroxy groups the affinity of the compounds for cellulose acetate was found to be unsatisfactory. Other dyes heretofore used for dyeing acetate silk were insoluble or so nearly insoluble in water that it was necessary to pretreat them to obtain a finely subdivided state of the dye and good dispersion thereof in the dye bath so that uneven dyeings could be avoided. In printing and often with dyeings made with such insoluble dyes, the printings and dyeings were speckled. Neither the soluble nor the insoluble dyes used heretofore had as satisfactory discharge properties as were desired; and many of the soluble dyes have not given dyeings on cellulose acetate which had satisfactory fastness to light and washing. It was therefore desirable to provide new water soluble dyes for cellulose esters and ethers which have good exhaust, discharge and fastness properties and will give level dyeings and printings.

It is among the objects of this invention to provide new monazo dyes for cellulose esters, ethers and similar materials which have sufficient solubility in water to enable them to be readily applied to the goods by dyeing and printing processes. Another object of the invention is to provide monazo compounds having N-polyhydroxy radicals in one or both components of the compound. Another object of the invention is to provide dyes for cellulose esters and ethers which have satisfactory discharge and exhaust properties. Another object of the invention is to provide such dyes which have good fastness properties. Still other objects of the invention will be apparent from the following description.

The objects of the invention may be attained in general by coupling an azo dye coupling component to a diazotized primary aryl amine which is represented by the formula

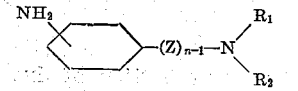

in which amino is meta or para to Z, R$_1$ is a polyhydroxyalkyl radical having four to six carbons and one less hydroxy groups than carbons, R$_1$ is one of a group consisting of hydrogen, alkyl and a substituted alkyl radical, Z is one of a group consisting of the radicals

—CH$_2$— and —SO$_2$—, $n$ is an integer not greater than 2, and the benzene ring may be unsubstituted or substituted by various groups. Various types of coupling components may be used and those having benzene nuclei may be substituted by R$_1$ groups. The objects of the invention are further attained by dyeing cellulose esters and ethers, such as cellulose acetate silk in solutions of such dyes, or when desirable, dispersions of the dyes in solutions thereof are used as the dye baths. A further object is to make printings by incorporating solutions and dispersions of the dyes in printing compositions.

The invention will be more fully set forth in the following more detailed description which includes examples that are given as illustrative embodiments of the inventtion and not as limitations thereof.

*Example I.—(Para-amino benzoyl)-N-methyl glucamine→beta-naphthol*

314 parts of N-(para-amino benzoyl)-N-methyl glucamine were dissolved in 1000 parts of water and 290 parts of 31.5% hydrochloric acid. The solution was cooled to 0.° C. by the addition of ice. 69 parts of sodium nitrite dissolved in 300 parts of water were gradually added during three to four minutes. A clear diazo solution was obtained. 144 parts of beta-naphthol were dissolved in 40 parts of sodium hydroxide and 1000 parts of water. The beta naphthol solution was cooled to 0.° C. by the addition of ice and 106 parts of sodium carbonate dissolved in 700 parts of water were added. The diazo solution was gradually run into the beta naphthol solution with stirring and when coupling was complete the dye separated from the coupling mixture. It was then isolated by filtration and dried. The compound is represented by the following formula

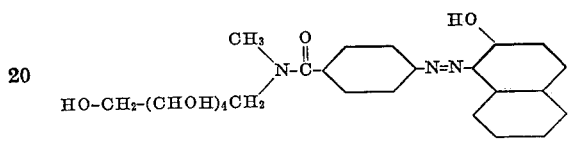

The following illustrates a convenient manner of utilizing the dyes of the invention. One part of the dry dye represented in the foregoing formula was added to 2000 parts of water and heated to 85° C., giving a solution. Fifty parts of a cellulose acetate fabric were entered and dyed in the usual manner by maintaining the dye bath at a temperature between 85° C. and 90° C. for forty-five minutes to one hour. The dyed cellulose acetate was withdrawn from the dye bath, washed well with cold water and dried. In this manner an attractive orange shade was obtained, which had good fastness properties. Dyeing temperatures between 70° C. and 95° C. give satisfactory results.

When it was desirable to have present in the dye bath a larger proportion of dye than was soluble, a dispersion of the dye in the solution was made conveniently by adding a dispersion agent, such as soap. Such a dye bath was used to dye cellulose acetate in the same manner as the solutions were used.

*Example II.—N-(Para-amino benzyl) N-methyl glucamine→para cresol*

300 parts of N-(para amino benzyl), N-methyl glucamine, prepared by condensing para nitro benzyl bromide with methyl glucamine and reducing the nitro group, were diazotized as in the preceding example and coupled to 108 parts of para cresol in a manner similar to that employed in Example I. A water solution of the product thus obtained dyed cellulose acetate a greenish yellow shade of good fastness properties. The compound is represented by the formula

*Example III.—N-(Para-amino benzyl), N-methyl glucamine→2,4-dihydroxy quinoline*

By using an equivalent amount of 2,4-dihydroxy quinoline instead of para cresol in the procedure of Example II a dye giving greenish yellow dyeings on acetate silk was made. The dye had satisfactory solubility and good fastness properties and is represented by the formula

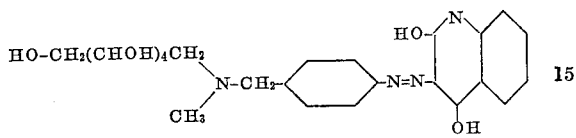

In like manner a greenish yellow dye of similar shade, solubility and fastness properties was made by coupling diazotized N-(para-amino benzoyl) glucamine with 2,4-dihydroxy quinoline. The formula of the compound is represented as follows:

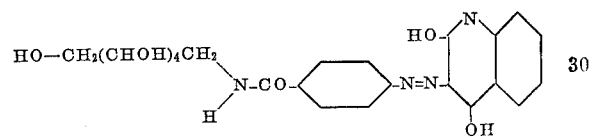

*Example IV.—N-(para-amino benzoyl) glucamine→N-methyl, N-sorbityl aniline*

Three hundred parts of N-(para-amino benzoyl) glucamine were diazotized as in Example I. 271 parts of N-methyl, N-sorbitol aniline were dissolved in 100 parts of water and 116 parts of 31.5% hydrochloric acid. The temperature of this solution was lowered to 0° C. by the addition of ice and 205 parts of sodium acetate were gradually added. The diazo solution was then gradually run into the solution of the tertiary amine with stirring. When coupling was complete the dye was isolated by adding sufficient 30% sodium hydroxide solution so that the coupling mixture was slightly alkaline to brilliant yellow paper and by filtering. The compound was then dried. A water solution of the compound dyed cellulose acetate silk a reddish yellow shade when used in the ratio of 1 part of dye to 50 parts of cellulose acetate and 2000 parts of water and a dyeing temperature between 75° C. and 90° C. The compound is represented by the following formula

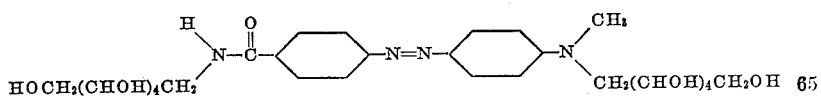

The following monoazo compounds were made by processes similar to those described in the foregoing examples. They had the same general properties as the dyes hereinbefore described except where differences are noted. In these examples the arrows point from the compounds which were diazotized toward the compounds which were used as coupling components and the colors noted are those produced by dyeing cellulose acetate silk from solutions of the dyes.

| Example | Amino base | Coupling component | Color |
|---|---|---|---|
| V | Para-amino sorbityl aniline → | Phenyl methyl pyrazolone | Orange shades. |
| VI | ...do... | m-Phenylene diamine | Reddish yellow. |
| VII | ...do... | Resorcin | Do. |
| VIII | N-(para-amino benzoyl) glucamine → | Para-cresol | Yellow. |
| IX | ...do... | Ethyl, hydroxy ethyl aniline | Orange. |
| X | ...do... | m-Phenylene diamine | Do. |
| XI | N-(m-amino benzene sulfonyl) glucamine → | 2,4 dihydroxy quinoline | Greenish yellow. |
| XII | ...do... | N-methyl, N-sorbityl aniline | Yellow. |
| XIII | N-(p-amino benzene sulfonyl) glucamine → | 2,4 dihydroxy quinoline | Greenish yellow. |
| XIV | N-(p-amino benzoyl) glucamine → | Acetoacetanilide | Do. |

The symbol $R_1$ of the general formula stands for a polyhydroxy alkyl group having four to six carbon atoms and one less hydroxy group than carbons. As examples of polyhydroxy alkyl groups are mentioned the radical of the alcohol sorbitol and the radicals of reduced aldose monosaccharides, such as erythrose, glucose, arabinose and still others besides those specifically mentioned which have the required number of carbon and hydroxy radicals. The polyhydroxyalkyl amino group may be a secondary or a tertiary amino group. When tertiary, $R_2$ may be an alkyl or a substituted alkyl radical. As illustrative of such radicals methyl, ethyl, propyl, butyl and even longer chain alkyl groups, hydroxyethyl, mono- and di-hydroxy propyl, beta-hydroxy-gamma-halo-propyl and longer chain mono- and di-hydroxyalkyl groups are mentioned.

The benzene ring of the amino base may be unsubstituted or it may be substituted once or more by any of the group consisting of halogen, alkyl and alkoxy.

The integer $n$ is always 1 or 2. When $n$ is 1 the secondary or tertiary amino nitrogen is directly attached to the benzene ring.

As illustrative of a method by which the amino bases may be made, one mole of glucamine is treated with one mole of meta or para-benzoyl chloride forming the corresponding N-nitrobenzoyl glucamine. The nitro group is then reduced to amino by well known methods giving the corresponding N-substituted aniline. By using an alkyl glucamine instead of glucamine, N-(para-amino-benzoyl) alkyl glucamines may be made. An N-(para-amino-benzyl)-N-methyl glucamine may be made by condensing methyl glucamine with para-nitro-benzyl bromide and then reducing the nitro group of the resulting compound. In like manner a meta- or para-nitro-benzene sulfonyl chloride is reacted with glucamine and the nitro group of the resulting compound is then reduced to form an N-(meta or para-benzene sulfonyl) glucamine. Para-amino sorbityl aniline may be made by condensing para-amino acetanilide with glucose and catalytically reducing as with hydrogen in the presence of a hydrogenating catalyst, such as nickel. The acetyl group is then removed by hydrolysis. By similar methods the amino bases may be derived from a variety of compounds.

The amino benzene or naphthalene, the hydroxy benzene or naphthalene, the enol and the heterocyclic types of coupling components which are devoid of sulfonic and carboxy groups are used in making the compounds of the invention. As illustrative of suitable coupling components the following are mentioned aniline, anilines which are substituted once or more in any of the meta and ortho positions by alkyl, alkoxy, secondary and tertiary amino groups, acylamino and halogen, naphthylamines having a free coupling position which may be substituted similarly to the amino benzenes, phenol, meta and para cresol, 1,3,5-xylenol, the alpha and beta naphthols, 2,4-dihydroxy quinoline, the phenyl-alkyl-pyrazolones such as phenyl-methyl-pyrazolone, and the acetoacetarylides such as acetoacetanilide. A large number of valuable compounds are made by coupling the various coupling components with the above described diazotized aryl amines.

Since from the foregoing description of the invention it will be apparent to those skilled in the art that various other embodiments of the invention may be made without departing from the spirit and scope thereof, it is to be understood that the invention is not restricted to the illustrative embodiments specifically set forth.

We claim:

1. A compound represented by the formula

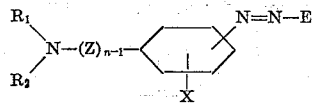

in which $R_1$ is a polyhydroxyalkyl radical having four to six carbons and one less hydroxy than carbons; $R_2$ is one of a group consisting of hydrogen, alkyl, hydroxyalkyl, and halogen substituted alkyl and hydroxy alkyl; Z is one of a group consisting of the radicals

—$CH_2$— and —$SO_2$—; $n$ is an integer not greater than 2; X is at least one of a group consisting of hydrogen, alkyl, alkoxy and halogen; and E is an azo dye coupling component which is devoid of sulfonic acid and carboxyl groups from the group consisting of hydroxy benzenes and naphthalenes, anilines, naphthylamines, enols, phenyl alkyl pyrazolones and hydroxy quinolines; the azo bridge being connected to the benzene nucleus in one of the positions meta and para to Z.

2. A compound represented by the formula

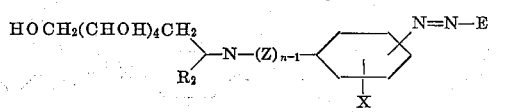

$R_2$ is one of a group consisting of hydrogen, alkyl, hydroxyalkyl, and halogen substituted alkyl and hydroxy alkyl; Z is one of a group consisting of the radicals

—$CH_2$— and —$SO_2$—; $n$ is an integer not greater than 2; X is at least one of a group consisting of hydrogen, alkyl, alkoxy and halogen; and E is an azo dye coupling component which is devoid of sulfonic acid and carboxyl groups from the group consisting of hydroxy benzenes and naphthalenes, anilines, naphthylamines, enols, phenyl alkyl pyrazolones and hydroxy quinolines; the azo bridge being connected to the benzene nucleus in one of the positions meta and para to Z.

3. A compound represented by the formula

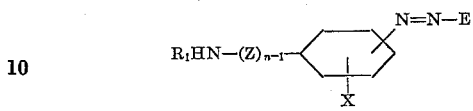

in which $R_1$ is a polyhydroxyalkyl radical having four to six carbons and one less hydroxy than carbons, Z is one of a group consisting of the radicals

—$CH_2$— and —$SO_2$—; $n$ is an integer not greater than 2; X is at least one of a group consisting of hydrogen, alkyl, alkoxy and halogen; and E is an azo dye coupling component which is devoid of sulfonic acid and carboxyl groups from the group consisting of hydroxy benzenes and naphthalenes, anilines, naphthylamines, enols, phenyl alkyl pyrazolones and hydroxy quinolines; the azo bridge being connected to the benzene nucleus in one of the positions meta and para to Z.

4. The compound represented by the formula

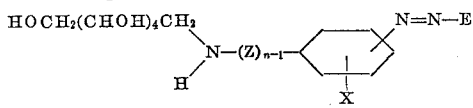

in which Z is one of a group consisting of the radicals

—$CH_2$— and —$SO_2$—; $n$ is an integer not greater than 2; X is at least one of a group consisting of hydrogen, alkyl, alkoxy and halogen; and E is an azo dye coupling component which is devoid of sulfonic acid and carboxyl groups from the group consisting of hydroxy benzenes and naphthalenes, anilines, naphthylamines, enols, phenyl alkyl pyrazolones and hydroxy quinolines; the azo bridge being connected to the benzene nucleus in one of the positions meta and para to Z.

5. The compound represented by the formula

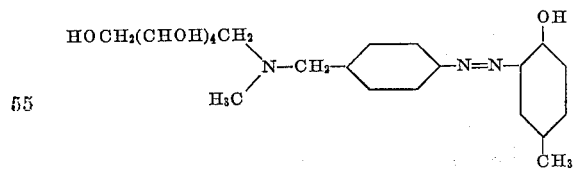

6. The compound represented by the formula

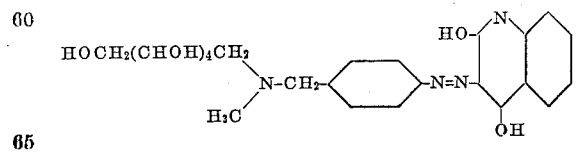

7. The compound represented by the formula

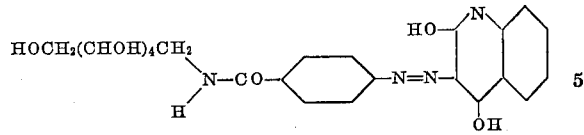

8. The process which comprises dyeing a textile material by applying to said material a solution of a compound represented by the formula

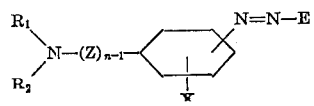

in which $R_1$ is a polyhydroxyalkyl radical having four to six carbons and one less hydroxy than carbons; $R_2$ is one of a group consisting of hydrogen, alkyl, hydroxyalkyl, and halogen substituted alkyl and hydroxy alkyl; Z is one of a group consisting of the radicals

—$CH_2$— and —$SO_2$—; X is at least one of a group consisting of hydrogen, alkyl, alkoxy and halogen; and E is an azo dye coupling component which is devoid of sulfonic acid and carboxyl groups from the group consisting of hydroxy benzenes and naphthalenes, anilines, naphthylamines, enols, phenyl alkyl pyrazolones and hydroxy quinolines; the azo bridge being connected to the benzene nucleus in one of the positions meta and para to Z; said solution being applied at temperatures between 70° C. and 95° C.

9. Process which comprises diazotizing a compound represented by the formula

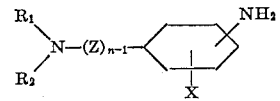

in which $R_1$ is a polyhydroxyalkyl radical having four to six carbons and one less hydroxy than carbons; $R_2$ is one of a group consisting of hydrogen, alkyl, hydroxyalkyl and halogen substituted alkyl and hydroxyalkyl; Z is one of a group consisting of

—$CH_2$— and —$SO_2$—; $n$ is an integer not greater than 2; X is at least one of a group consisting of hydrogen, alkyl, alkoxy and halogen; and the amino group is in one of the positions meta and para to Z; and coupling to an equi-molecular proportion of an azo dye coupling component which is devoid of sulfonic acid and carboxyl groups from the group consisting of hydroxy benzenes and naphthalenes, anilines, naphthylamines, enols, phenyl alkyl pyrazolones and hydroxy quinolines.

EMMET F. HITCH.
SWANIE S. ROSSANDER.
DONOVAN E. KVALNES.

CERTIFICATE OF CORRECTION.

Patent No. 2,173,056.　　　　　　　　　　　　　　September 12, 1939.

EMMET F. HITCH, ET AL.

It is hereby certified that error appears in the printed specification of the above numbered patent requiring correction as follows: Page 1, first column, line 21-22, for "benzene-azo-bis-hydroxypropyl-aniline" read benzene-azo-bis-dihydroxypropyl-aniline; and second column, line 46, for "(Para-amino benzoyl)" read N(Para-amino benzoyl); and that the said Letters Patent should be read with this correction therein that the same may conform to the record of the case in the Patent Office.

Signed and sealed this 17th day of October, A. D. 1939.

(Seal)　　　　　　　　　　　　　　　　　　　Henry Van Arsdale,
　　　　　　　　　　　　　　　　　　　　Acting Commissioner of Patents.